US008260518B2

(12) United States Patent
Englert

(10) Patent No.: US 8,260,518 B2
(45) Date of Patent: Sep. 4, 2012

(54) TRAILER SWAY CONTROL WITH REVERSE SENSORS

(75) Inventor: Kirk Matthew Englert, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1195 days.

(21) Appl. No.: 12/014,053

(22) Filed: Feb. 6, 2008

(65) Prior Publication Data

US 2009/0198425 A1 Aug. 6, 2009

(51) Int. Cl.
*B60T 8/24* (2006.01)

(52) U.S. Cl. .................. 701/72; 701/1; 701/70; 701/71; 701/78; 701/82; 303/7; 303/123; 303/124

(58) Field of Classification Search ........................ None
See application file for complete search history.

(56) References Cited

U.S. PATENT DOCUMENTS 4,060,284 A * 11/1977 Steiner .......................... 303/123
5,033,798 A 7/1991 Breen
5,690,347 A 11/1997 Juergens et al.
6,042,196 A * 3/2000 Nakamura et al. ................ 303/7
6,139,118 A * 10/2000 Hurst et al. ........................ 303/7
6,273,522 B1 * 8/2001 Feetenby et al. .................. 303/7
6,446,998 B1 * 9/2002 Koenig et al. ................. 280/432
6,523,911 B1 * 2/2003 Rupp et al. ........................ 303/7
6,668,225 B2 * 12/2003 Oh et al. ......................... 701/70
6,705,684 B1 * 3/2004 Garvey ......................... 303/123
6,913,328 B2 * 7/2005 Eckert et al. .................. 303/191
6,959,970 B2 * 11/2005 Tseng .......................... 303/146
7,447,585 B2 * 11/2008 Tandy et al. .................... 701/70
7,562,946 B2 * 7/2009 Leimbach et al. ............ 303/123
7,731,302 B2 * 6/2010 Tandy et al. ...................... 303/7
7,786,849 B2 * 8/2010 Buckley ........................ 340/431
7,917,274 B2 * 3/2011 Hackney et al. ................ 701/82
2004/0148085 A1 7/2004 Heuer
2005/0011693 A1 1/2005 Horn et al.
2006/0244579 A1 * 11/2006 Raab ............................ 340/438
2007/0260386 A1 * 11/2007 Tandy et al. .................... 701/70
2008/0186204 A1 * 8/2008 Buckley ........................ 340/901
2009/0093928 A1 * 4/2009 Getman et al. .................. 701/37
2009/0105906 A1 * 4/2009 Hackney et al. ................ 701/38

OTHER PUBLICATIONS

John M. Williams Jr. et al., "Trailer Stabilization through Active Braking of the Towing Vehicle", SAE Technical Paper Series, Mar. 8-11, 2004, pp. 1-11, SAE International, Warrendale, PA, USA.

* cited by examiner

*Primary Examiner* — Khoi Tran
*Assistant Examiner* — Jonathan L Sample
(74) *Attorney, Agent, or Firm* — Nugent & Smith, LLP; Robert Hess; Theresa O'Rourke Nugent

(57) ABSTRACT

Reverse proximity sensors are used to determine an angle between a towed trailer and the towing vehicle. The trailer sway control determines a trailer angle of sway based upon proximity sensor readings from the reverse proximity sensors and from a sensor reading of an angle of turn of a steering wheel of the towing vehicle. Provided the determined trailer angle of sway exceeds a range that can be tolerated, a controller sends instructions to apply necessary braking to the vehicle or trailer to mitigate the trailer sway.

24 Claims, 5 Drawing Sheets

TRAILER SWAY CONTROL WITH REVERSE SENSORS

BACKGROUND OF THE INVENTION

The present invention is directed to a towed trailer sway control using vehicle reverse back-up proximity sensors and a trailer brake controller, whether integrated or added-on.

DISCUSSION OF RELATED ART

There are many different kinds of trailers. A trailer is any type of wheeled transport vehicle that normally is hitched to a towing vehicle for towing purposes. The trailer may be a horse trailer, a boat trailer, a house trailer, a camper trailer, a mobile home trailer, an auto transport trailer, a cargo trailer, a dump trailer, a moving equipment trailer, a landscape and utility trailer, a motorcycle, ATV, Jet Ski and Golf cart trailer, etc.

Towed trailers are susceptible to sway caused by horizontal crosswinds, road inconsistencies, misloading of the trailer or other effects. This sway can cause a vehicle/trailer system to become unstable potentially creating a jack-knife scenario.

There is a conventional system to reduce trailer sway by using a tow vehicle's electronic stability control system. Unfortunately, it does not create the necessary tension at the hitch, because it cannot apply the trailer brakes.

Indeed, the conventional system uses a yaw rate sensor to detect vehicle yaw oscillations that occur in a specific frequency band that would coincide with trailer sway. Since such a system does not know a trailer is connected in advance, it must wait a certain number of oscillations to verify it to be trailer sway.

It would be desirable to prevent trailer sway without requiring the tow vehicle to implement a full electronic stability control system. As a result, the tow vehicle need not even have an electronic stability control system for trailer sway to be prevented, thereby providing cost savings through the elimination of the electronic stability control system altogether for a tow vehicle. It would further be desired to check whether a trailer is hitched to a towing vehicle to enable trailer sway control.

SUMMARY OF THE INVENTION

One aspect of the invention resides in braking a trailer and/or vehicle brakes to counter trailer sway based on proximity sensor readings and steering wheel turn readings. The braking may be under the guidance of a trailer sway control system. Such a system may be activated or enabled if a trailer is sensed as being behind a towing vehicle; otherwise, the system is disabled. Reverse proximity sensors or sensors in a trailer brake controller may sense whether the trailer is attached to a towing vehicle. The trailer sway control system may determine a trailer angle of sway based upon the proximity sensor readings from the reverse proximity sensors and from a sensor reading of an angle of turn of a steering wheel of the towing vehicle. Provided the determined trailer angle of sway exceeds a range that can be tolerated, the trailer sway control system sends instructions to apply necessary braking to the vehicle or trailer. The amount of braking applied to the trailer brakes may be, for instance, the same for each of the trailer brakes or different for trailer brakes on different sides of the trailer.

If the vehicle is equipped with stability control, then the determined trailer angle of sway can be compared with a yaw rate and lateral acceleration to verify the presence of trailer sway being present. Unless there is agreement that trailer sway is present, the controller will not send such instructions to apply necessary braking to the vehicle or trailer. Instead, the determination of trailer angle of sway will be repeated and compared with the yaw rate and lateral acceleration from the stability control until an agreement is reached that trailer sway is present at which time the braking may be applied to counter the trailer sway.

A further aspect of the invention resides in apparatus and method to effect trailer sway control. That is, by sensing whether a trailer is behind a towing vehicle based on proximity readings from proximity sensors, sensing an angle of turn of a steering wheel of the towing vehicle, determining a trailer angle of sway based on the proximity sensor readings and on the sensed angle of turn of the steering wheel (the trailer angle of sway being dependent upon an extent to which one side of the trailer is closer to the towing vehicle than is a further side of the trailer) and performing trailer sway control by applying braking to wheels of the vehicle or trailer to counter the trailer sway in a manner that furthers stabilization.

BRIEF DESCRIPTION OF THE DRAWING

For a better understanding of the present invention, reference is made to the following description and accompanying drawing, while the scope of the invention is set forth in the appended claims.

DETAILED DESCRIPTION OF THE PREFERRED EMBODIMENT

Figure 1:
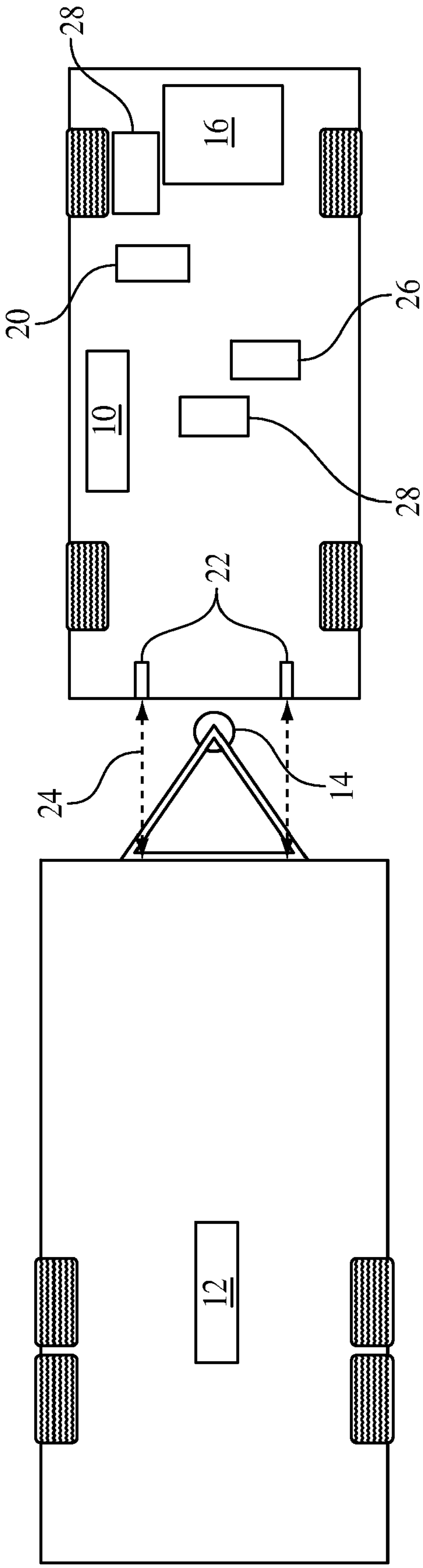
FIG. 1 is a schematic diagram of a towed trailer sway control using reverse proximity sensors in accordance with the invention.

There are three methods to perform trailer sway control: (1) with vehicle braking only, (2) with trailer braking only, or (3) with a combination. These three methods may include vehicle braking with different forces at different wheels, vehicle braking with the same force at all wheels or trailer braking with the same force at all wheels or trailer braking with different forces at different wheels.

The present invention performs sway control by braking the trailer based on proximity sensor readings and steering wheel turn readings. The steering wheel turn readings are obtained in a conventional manner that senses the turning of the steering wheel of the towing vehicle. The proximity sensor readings are obtained by conventional proximity sensors, but have not be employed to address the problem of trailer sway. The proximity sensors may be of any conventional type.

For instance, proximity sensors suited for providing proximity sensor readings in accordance with the invention include (1) ultrasonic (radar) proximity sensors, (2) magnetic and electro-magnetic proximity sensors, (3) inductive proximity sensors, (4) photoelectric and light-emitting (proximity) sensors. (5) capacitive proximity sensors, (6) infrared proximity sensors, (7) laser (distance-measuring) proximity sensors, (8) rotary potentiometers, (9) string potentiometers—(they would be attached to vehicle and trailer and measure distance change similar to other kinds of proximity sensors), (10) linear/slide potentiometers, (11) single and multiple camera systems (including those requiring target placed on trailer), (12) pneumatic proximity sensors, and (13) electro-static proximity sensors.

Trailer sway may be addressed by using the vehicle's proximity sensors, such as reverse back-up proximity sensors, to determine the yaw-angle of the trailer relative to the centerline of the tow vehicle, and braking the vehicle and/or trailer (with a trailer brake controller) appropriately, in communication with the reverse back-up sensors, to eliminate the trailer sway. The reverse sensors would be handed, with a left and a right side. The sensor data would be sent to an aftermarket or integrated (preferred) trailer brake controller.

The sensor data can be processed by a stability control system, trailer brake controller or by a module that evaluates reverse back-up to determine if the trailer is under a significant amount of sway compared to the vehicle (a steering wheel angle or the front axle wheel speed difference would be used to verify that the tow vehicle is not in a turn). By evaluating the difference between the proximity sensor values (left and right), the yaw-angle of the trailer relative to the centerline of the tow vehicle can be accomplished and the direction of trailer sway.

For example, if the left is much smaller proximity than the right, it can be inferred that the trailer is swaying to the left. Likewise, if the right is much smaller proximity than the left, it can be inferred that the trailer is swaying to the right.

It should be noted that calculating a trailer angle would be the most universal method for determining sway because it would adapt for any trailer attached, give a better understanding of the trailer movement, and could be used by other systems in the vehicle. However the left and right distances alone could also be used to determine sway based upon a linear growth, i.e., change in distance. For example the trailer is swaying if the left or right distance increased or grew linearly by 20%, but the steering wheel angle remained constant.

If the trailer brake controller determines or is notified that the trailer is in significant sway and the vehicle is not in a turn, it would apply the trailer brakes in an appropriate manner to create tension between the tow vehicle and trailer and thereby further stability. This tension would reduce the trailer sway condition and bring the trailer back under control.

The present invention may be employed for any vehicle that is used for towing a trailer that has brakes, for any vehicle with an integrated brake controller and for any vehicle that tow's and contains reverse park aid sensors.

Turning to FIG. 1, there is a towing vehicle 10 and a trailer 12. The trailer 12 is being towed via a trailer hitch 14 by the towing vehicle 10. An engine 16 powers the towing vehicle whose direction of travel is directed by a conventional steering wheel and system. Trailer sway control is effected by use of a trailer brake controller (TBC) 20, reverse proximity sensors 22, reverse proximity sensor module 26 and vehicle brake controller and sensor cluster 28.

Trailer brake controller (TBC) 20 in accordance with the invention may be either an integrated TBC (from OEM, like Ford integrated TBC on 2005+ SuperDuty pickups) that has ability to communicate with vehicle systems, or an aftermarket one to be constructed in accordance with the invention that has the same ability.

Reverse Proximity Sensors 22 are located in a rear bumper or rear panel of vehicle. Currently these are not processed from side to side. This invention would start processing them according to side to measure trailer angle (see FIG. 2) based on reverse proximity sensor measurement signals 24.

Reverse Proximity Sensor Module 26 powers and receives output from the reverse proximity sensors. It would process which direction the trailer is moving based upon the mathematical sign of the angle between vehicle and trailer (see FIGS. 2-4).

Vehicle brake controller & Sensor Cluster 28 include ABS, stability control and trailer sway control. For the purposes of this invention, stability control would not be required, however an ABS unit would not be sufficient since the brake controller would need to build pressure without driver apply and potentially higher than driver apply. Therefore it would need similar hardware to a stability or traction control module, and a steering wheel angle sensor, but would not require sensor cluster (which contains at least yaw rate and lateral acceleration sensors). Signals from the sensor cluster (if available) would be used to "double-check" trailer sway (see FIGS. 5-6).

Figure 2:
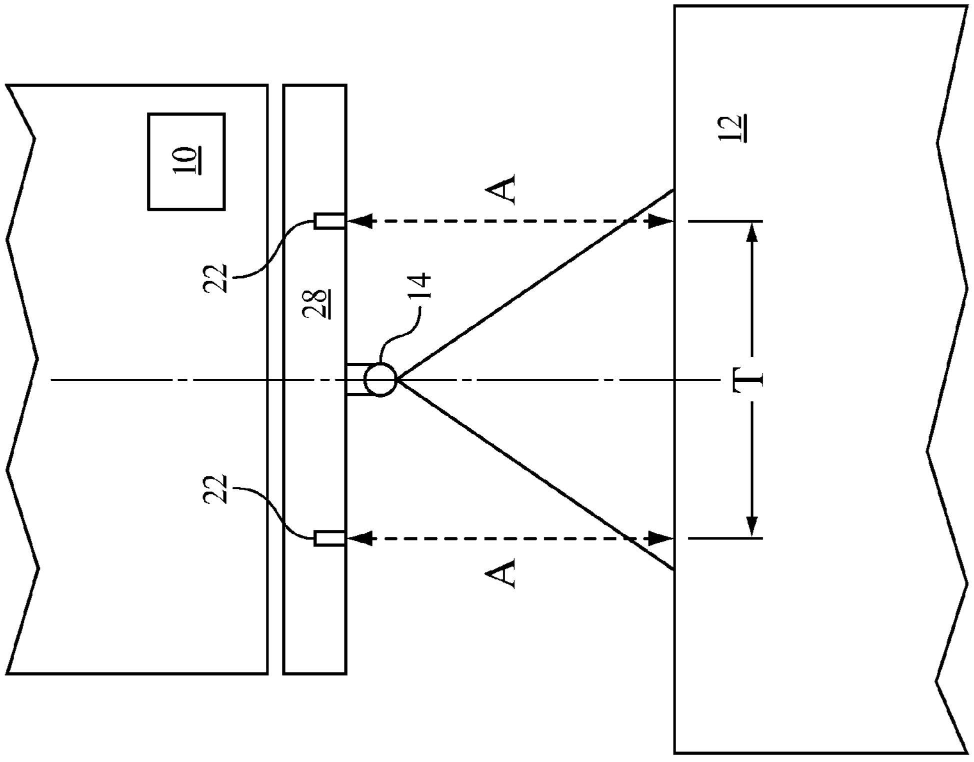
FIG. 2 is a schematic representation of towing straight ahead in accordance with the invention.

Turning to FIG. 2, the relative position of the trailer 12 to the vehicle 10 is depicted for towing straight ahead. The distance A may either be the distance along the centerline from the trailer hitch 14 to the trailer 12 or from each of the reverse proximity sensors 22 on the rear bumper 28 to a sensed location on the trailer 12 that is directly behind. The distance T defines the distance between the left and right proximity sensors 22. The trailer angle θ is zero since the distances A to the left and right of the centerline are the same, as computed with the equation:

$$\theta=\sin^{-1}((A-A)/T)=0$$

Figure 3:
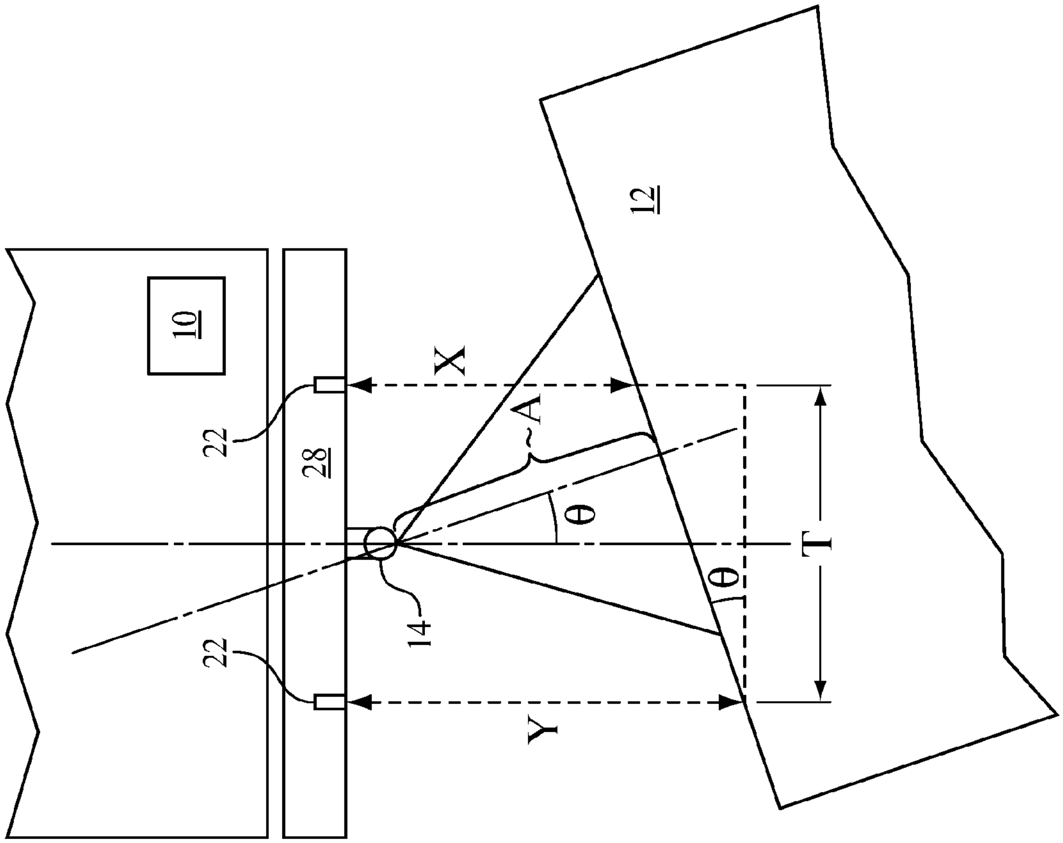
FIG. 3 is a schematic representation of the trailer angle induced by turning or trailer sway in accordance with the invention.

Turning to FIG. 3, the relative position of the trailer 12 to the vehicle 10 is depicted for the trailer angle induced by turning or trailer sway. An offset is created when the trailer is no longer centered behind the vehicle, such as when turning or when the trailer is swaying. Such an offset means that the distances X and Y to the right and left, respectively of the centerline between the applicable left and right reverse proximity sensors 22 and the sensed location on the trailer 12 behind are not the same. The trailer angle is determined by the relation:

$$\theta=\sin^{-1}((Y-X)/T)$$

$$|\theta|>0$$

such that when the angle is greater than zero the trailer is swaying to the right and when it is negative the trailer is swaying to the left.

A supporting equation in case trailer angle is so large that Y (or X for negative angles) goes to infinity (i.e. trailer rotated out of radar range) would be $\theta\approx\cos^{-1}(X/A)$. The distance between the trailer hitch 14 and the location on the trailer 12 can be approximated as A, the distance measured when towing straight ahead. This distance could also be measured and entered by the vehicle/trailer owner to the trailer brake controller (TBC), stability control system (SCS) or reverse backup module.

Figure 4:
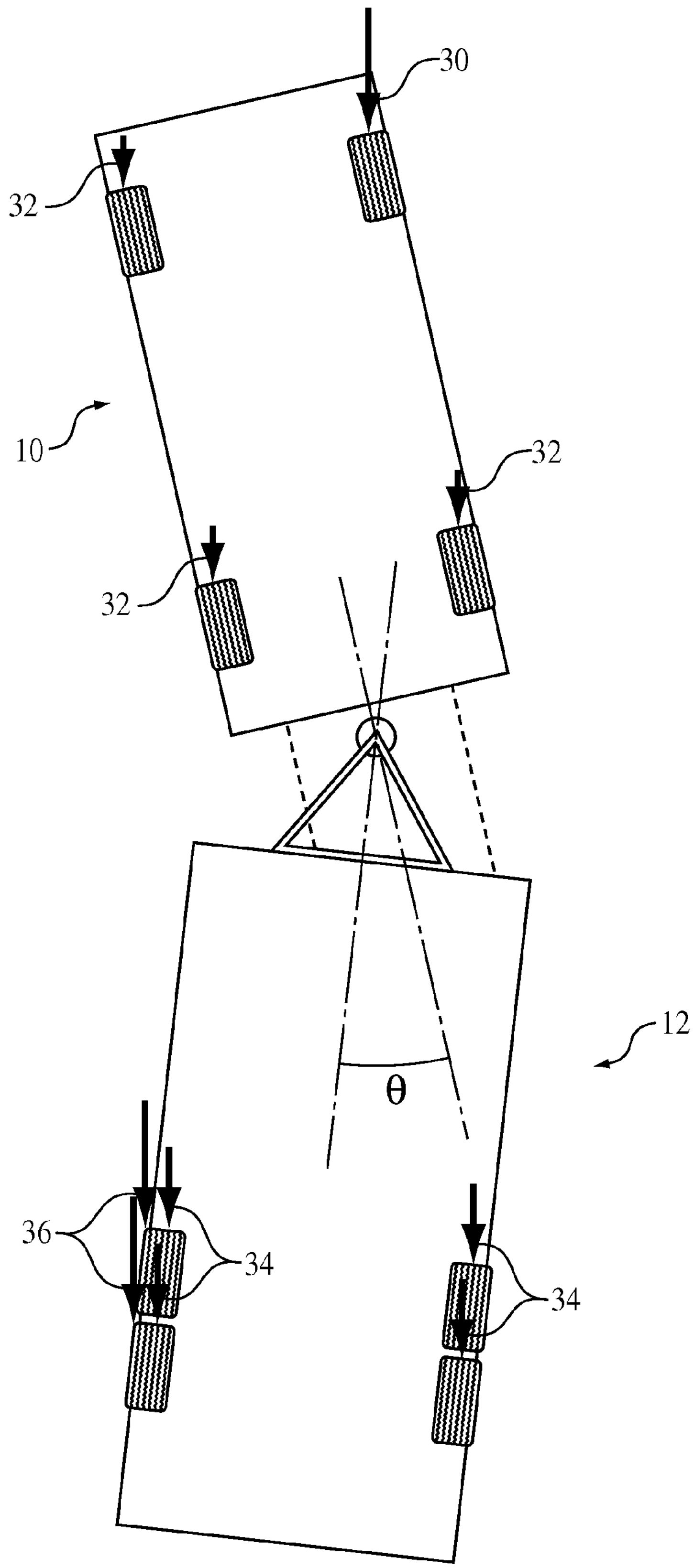
FIG. 4 is a schematic representation of where brake torque is applied for trailer sway control in accordance with the invention and compares it with where brake torque is applied to a conventional trailer sway control system.

Turning to FIG. 4, trailer sway control is depicted schematically. Applying the brake torque at selected wheels causes counter moments to trailer sway. Such is represented by the larger arrow 30 at front passenger side vehicle wheel, but may arise for brake torque applied at all wheels to slow vehicle-trailer train (smaller arrows 32 at vehicle wheels). This is the extent of the conventional system. It uses a yaw rate sensor to detect vehicle yaw oscillations that occur in a specific frequency band that would coincide with trailer sway. Since it does not know a trailer is connected, it must wait a certain number of oscillations to verify it to be trailer sway.

Since the proximity sensors can verify a trailer is connected, and also measure trailer angle, then sway can be detected and verified in accordance with the invention sooner and more accurately than was the case for conventional systems that waited a certain number of oscillations to verify there was trailer sway and therefore controlled sooner, effectively reducing the sway in a shorter time. The knowledge of the trailer angle can verify that the trailer is definitively swaying, whereas using the yaw rate of the vehicle has the potential to cause false activations of the conventional system, because it is inferred (not verified) sway. Therefore these conventional systems could be fooled by certain driving or road scenarios (like undulating roads) and perform trailer sway control when there is not sway and possibly there is no trailer connected. Since the method according to the invention only requires proximity sensors 22 that may already be on vehicle 10 it is less expensive than the sensors for measuring yaw rate and lateral acceleration require by a stability control system.

This invention can also control sway that may not be growing in amplitude, but is still large. This would be an increase in safety over the conventional system, which cannot fully assume sway in this scenario because of the limitations of sensor signals. For example the trailer may be swaying but due to a mass difference between the vehicle and trailer the yaw rate sensor with standard trailer sway control may not read this trailer sway. The method according to the invention would recognize the trailer sway according to the trailer angle and provide control as necessary.

When using an integrated trailer brake controller and applying brake torque on the trailer 12 in accordance with the invention, such use and application creates tension in the system and aids in any desired controlled deceleration, but without the need for trailer brake output to be dependent upon the conventional system. Instead, the trailer brake output could be based on the magnitude of the trailer angle, instead of the yaw rate of the vehicle as was relied upon conventionally, therefore being more accurate.

This is the case for applying conventional trailer brake technology, which brakes all wheels equally as indicated by the arrows 34. It would be better to provide different brake torques on trailer wheels if the trailer brake technology allowed for it—see arrows 36.

Figure 5:
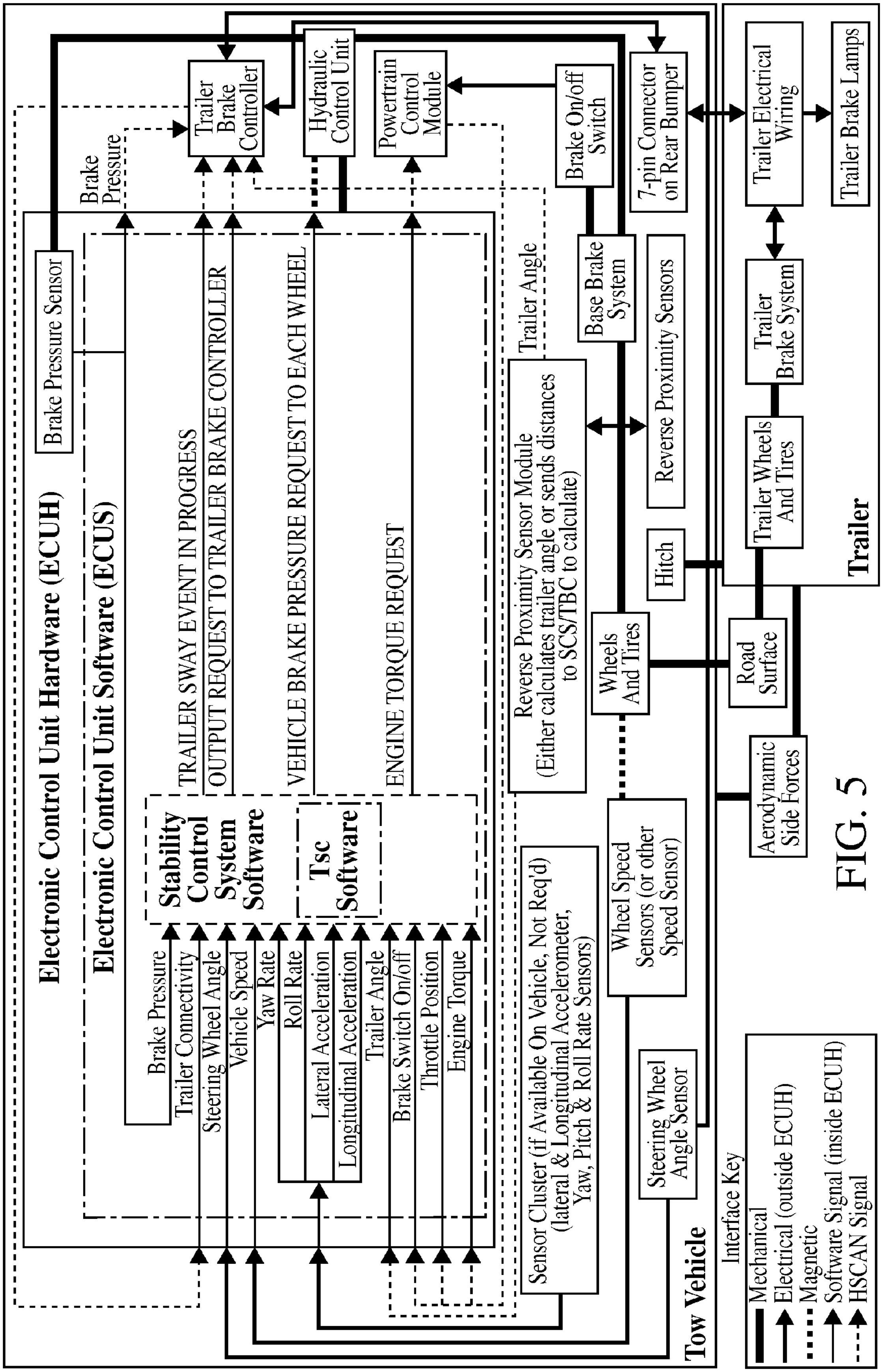
FIG. 5 is a boundary diagram for practicing the method in accordance with the invention.

FIG. 5 indicates in bold what is added in accordance to the invention over a conventional trailer sway control system. In particular, the electronic control unit software as concerns the stability control system software and TSC software and reliance on the trailer angle for making determinations as to trailer sway control based on signals from a reverse proximity sensor module, which receives input from reverse proximity sensors. The reverse proximity sensor module either calculates the trailer angle or sends the corresponding distances (for calculating trailer angle) to the stability control system or TBC to calculate. Instructions in the form of signals may be sent by the stability control system (with trailer sway control) or trailer brake controller to apply necessary braking to vehicle and/or trailer wheels with appropriate forces to counter the trailer sway in a manner that further stabilization.

Figure 6:
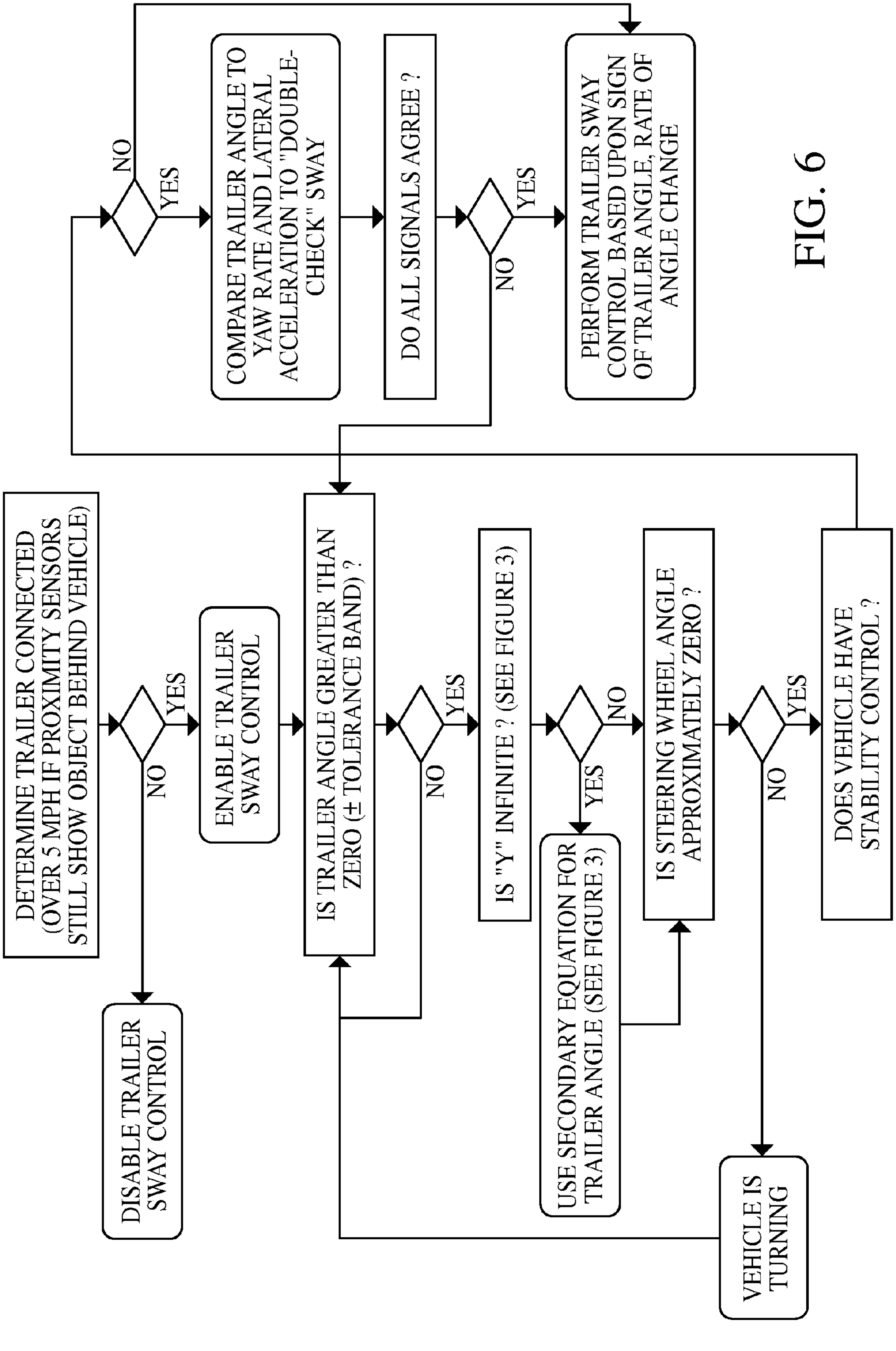
FIG. 6 is a simplified algorithm diagram for practicing the method in accordance with the invention.

FIG. 6 shows the steps involved for practicing the method in accordance with the invention. In general, the method involves determining whether the trailer is connected and, if so, determining whether the trailer angle warrants correction (exceeds tolerance levels) and whether the vehicle is turning. If the vehicle has stability control, the trailer angle is compared to the yaw rate and lateral acceleration to double check for the presence of sway. Indeed, the use of the proximity sensors improve the current trailer sway control systems, as they would now know trailer angle. Otherwise or thereafter, trailer sway control is performed based upon sign of there being a trailer angle that exceeds tolerance levels and based upon a rate of angle change.

Also, applying different brake forces at different wheels of the trailer for trailer sway would not require the reverse back up sensors for trailer sway control but would again be improved with the method of invention due to calculated trailer angle. It just requires a TBC that communicates with the SCS and could brake the individual trailer wheels (actually only needs to brakes different sides of the trailer).

While the foregoing description and drawings represent the preferred embodiments of the present invention, it will be understood that various changes and modifications may be made without departing from the scope of the present invention.

What is claimed is:

1. A method of trailer sway control, comprising: the steps of: taking proximity sensor readings to sense proximity between a trailer and a towing vehicle that is towing the trailer; sensing a turning of a steering wheel of the towing vehicle to provide steering wheel turn readings; calculating a trailer angle of sway in a manner that is independent of measured yaw rate, the calculating being based on the steering wheel turn readings and the proximity sensor readings, braking to counter trailer sway in a manner that furthers stabilization by taking into account the calculated trailer angle of sway, the proximity sensor readings and the steering wheel turn readings.

2. The method of claim 1, further comprising checking whether the towing vehicle has stability control sensors and, if so, verifying a presence of the trailer sway by making a comparison between a result of a calculation based on the proximity sensor readings and a measured yaw rate and lateral acceleration from the stability control sensors, the braking of the trailer to counter the trailer sway taking place provided there is agreement as a result of the comparison that indicates presence of the trailer sway.

3. The method of claim 1, further comprising determining whether the calculated trailer angle of sway is indicative of an amount of trailer sway that exceeds a range of tolerance for the trailer sway and, only if so, carrying out the braking in a manner that furthers stabilization.

4. The method of claim 1, wherein the braking to further the stabilization takes place under direction of a trailer sway control system, further comprising activating the trailer sway control system to direct the braking to further the stabilization in response to the trailer sway only if an analysis based on either the proximity sensor readings or trailer brake controller feedback readings reveals that the trailer is behind the towing vehicle.

5. The method of claim 1, further comprising operating at least two reverse proximity sensors to provide the proximity sensor readings each aimed at a respective one of two locations on a front of the trailer that faces the towing vehicle, one of the locations being behind a driver side of the towing vehicle and the other of the locations being behind a passenger side of the towing vehicle.

6. The method of claim 1, wherein the calculating includes computing the trailer angle of sway based on the relation $\sin^{-1}((Y-X)/T)$ provided that Y is other than indeterminate or infinite, where X represents a distance between a front of the trailer and a rear of the towing vehicle along a driver side, Y represents a further distance between a front of the trailer and a rear of the towing vehicle along a passenger side, and T represents a distance between the two reverse proximity sensors.

7. The method of claim 1, wherein the calculating approximates the trailer angle of sway based on the relation of $\cos^{-1}(X/A)$ in the case where Y is sensed to be indeterminate or infinite, where A represents a distance along a centerline of the trailer from a trailer front to the proximity sensors at a rear of the towing vehicle, the distance between the trailer hitch and trailer front being based on data in any one of a trailer brake controller, stability control system and reverse backup module.

8. The method of claim 1, wherein the braking is at an equal force of application at each wheel of either the vehicle or trailer in a manner that furthers stability.

9. The method of claim 1, wherein the braking is applied at different forces of application at each wheel of either the vehicle or trailer in a manner that furthers stability.

10. The method of claim 8 or 9, wherein the braking is applied either to only wheels of the vehicle, to only wheels of the trailer, or to both the wheels of the vehicle and the trailer in a manner that furthers the stability.

11. The method of claim 1, wherein the proximity sensor readings are readings taken from proximity sensors selected from a group consisting of distance, angle, camera, laser, ultrasonic and radar.

12. The method of claim 1, further comprising calculating changes in distance with the proximity sensors, carrying out the braking based on the calculated changes in distance and the sensed turning of the steering wheel.

13. An apparatus suited for trailer sway control, comprising: at least one proximity sensor configured and arranged to sense proximity between a trailer and a towing vehicle that tows the trailer so as to provide proximity sensor readings; at least one detector arranged to sense a turning of a steering wheel of the towing vehicle to provide steering wheel turn readings; and a trailer sway control system configured to calculate a trailer angle of sway in a manner that is independent of measured yaw rate yet based on the steering wheel turn readings and the proximity sensor readings and to direct braking to counter trailer sway in a manner that furthers stabilization by taking into account the calculated trailer angle of sway, the proximity sensor readings and the steering wheel turn readings.

14. The apparatus of claim 13, wherein the trailer sway control system is configured to check whether the towing vehicle has stability control sensors and, if so, to verify a presence of the trailer sway by making a comparison between a result of a calculation based on the proximity sensor readings and a measured yaw rate and lateral acceleration based on readings from the stability control sensors, the trailer sway control system being configured to direct the braking to further the stabilization only if there is agreement as a result of the comparison that indicates the presence of the trailer sway.

15. The apparatus of claim 13, wherein the trailer sway control is activated to direct the braking to further the stabilization in response to the trailer sway only if an analysis of either the proximity sensor readings or trailer brake controller feedback readings reveals that the trailer is behind the towing vehicle.

16. The apparatus of claim 13, wherein the trailer sway control system is configured to determine whether the trailer angle of sway is indicative of an amount of trailer sway that exceeds a range of tolerance for the trailer sway and, only if so, to direct the braking to further the stabilization.

17. The apparatus of claim 13, wherein the proximity sensors include at least two reverse proximity sensors to provide the proximity sensor readings each aimed at a respective one of the side and the further side of the trailer.

18. The apparatus of claim 13, wherein the trailer sway control system is configured to calculate the trailer angle of sway based on the relation $\sin^{-1}((Y-X)/T)$ provided that Y is other than indeterminate or infinite, where X represents a distance between a front of the trailer and a rear of the towing vehicle for the one side, Y represents a further distance between a front of the trailer and a rear of the towing vehicle for the further side, and T represents a distance between the two reverse proximity sensors.

19. The apparatus of claim 13, wherein the trailer sway control system is configured to approximate the trailer angle of sway based on the relation of $\cos^{-1}(X/A)$ in the case where Y is sensed to be indeterminate or infinite, where A represents a distance along a centerline of the trailer from a trailer front to a trailer hitch at a rear of the towing vehicle.

20. The apparatus of claim 13, wherein the trailer sway control system is configured to send instructions to apply the braking to each wheel of either the vehicle or the trailer at an equal force of brake application in a manner that furthers stability.

21. The apparatus of claim 13, wherein the trailer sway control system is configured to send instructions to apply the braking to each wheel of either the vehicle or the trailer at different forces of brake application in a manner that furthers stability.

22. The apparatus of claim 20 or 21, wherein the trailer sway controller system is configured to send instructions to apply the braking either to only wheels of the vehicle, to only wheels of the trailer, or to both the wheels of the vehicle and the trailer in a manner that furthers the stability.

23. The apparatus of claim 13, wherein the proximity sensor readings are readings taken from proximity sensors selected from a group consisting of distance, angle, camera, laser, ultrasonic and radar.

24. The apparatus of claim 13, wherein the trailer sway control system is configured to calculate changes in distance with the proximity sensors and to send instructions to carry out the braking based on the calculated changes in distance and the sensed turning of the steering wheel.

* * * * *